United States Patent [19]

Corley

[11] Patent Number: 4,927,907

[45] Date of Patent: May 22, 1990

[54] BISBENZOCYCLOBUTENE/BISIMIDE/-FREE RADICAL POLYMERIZATION INHIBITOR COMPOSITION

[75] Inventor: Larry S. Corley, Houston, Tex.

[73] Assignee: Shell Oil Company, Houston, Tex.

[21] Appl. No.: 358,742

[22] Filed: May 30, 1989

[51] Int. Cl.$^5$ .............................................. C08G 73/12
[52] U.S. Cl. .................................. 528/322; 428/411.1;
428/473.5; 528/170; 528/321
[58] Field of Search ....................... 528/322, 321, 170;
428/411.1, 473.5

[56] References Cited

U.S. PATENT DOCUMENTS

| | | | |
|---|---|---|---|
| 4,160,859 | 7/1979 | Renner et al. | 528/322 |
| 4,288,583 | 9/1981 | Zahir et al. | 526/262 |
| 4,463,147 | 7/1984 | Diethelm et al. | 526/262 |
| 4,465,882 | 8/1984 | Miller et al. | 585/4 |
| 4,518,755 | 5/1985 | Locatelli et al. | 526/262 |
| 4,525,572 | 6/1985 | Diethelm et al. | 528/170 |
| 4,533,727 | 8/1985 | Gaku et al. | 528/361 |
| 4,540,763 | 9/1985 | Kirchoff | 526/281 |
| 4,642,329 | 2/1987 | Kirchoff et al. | 526/284 |
| 4,665,881 | 8/1984 | Miller et al. | 585/2 |
| 4,707,533 | 11/1987 | Hefner | 528/96 |
| 4,711,964 | 12/1987 | Tan et al. | 548/461 |
| 4,730,030 | 3/1988 | Hahn et al. | 526/262 |

FOREIGN PATENT DOCUMENTS 86100718 10/1986 European Pat. Off. .

OTHER PUBLICATIONS

Tan et al., "High-Temperature Thermosetting Resin . . . ," *Polymer Preprints* 27, pp. 453–454, (1986).
Tan et al., "Melt Polymerization . . . ," *Polymer Preprints* 28, pp. 650–655, (1987).
Tan et al., "Benzocyclobutene in Polymer Synthesis III . . . ," *J. of Polymer Sci.*, 26, pp. 3103–3117, (1988).

*Primary Examiner*—Harold D. Anderson

[57] ABSTRACT

A composition is disclosed comprising a bisbenzocyclobutene, a bismide and a free radical inhibitor. The free radical inhibitor is preferably phenothiazine. The presence of the free radical inhibitor enhances the toughness and high-temperature viscosity stability of bisbenzocyclobutene/bismaleimide copolymers.

38 Claims, No Drawings

BISBENZOCYCLOBUTENE/BISIMIDE/FREE RADICAL POLYMERIZATION INHIBITOR COMPOSITION

BACKGROUND OF THE INVENTION

This invention relates to thermosettable resin compositions and their preparation. In a specific embodiment, the invention relates to bismaleimide/bisbenzocyclobutene copolymers having improved toughness, reduced melt viscosity and improved viscosity stability.

Advanced composites are high-performance materials made up of a fiber-reinforced thermoplastic or thermosettable material. Thermosettable materials useful in advanced composites applications must meet a set of demanding property requirements. For example, such materials should optimally have good high-temperature properties such as high (above 200° C.) cured glass transition temperature and low (less than 3%) water absorption at elevated temperature. Such materials should also exhibit superior mechanical strength, as reflected in measurements of Mode I fracture toughness above 2 MPa.m$^{\frac{1}{2}}$. For ease of processing in preparing prepregs for composite parts, the uncured material ideally has a low (below 120° C.) melting temperature.

Examples of thermosettable materials useful in advanced composites include epoxy resins, bisbenzocyclobutene resins and bismaleimide resins. Epoxy resins have good processing properties, but generally have relatively low glass transition temperatures and unacceptable high-temperature water absorption, and they are also generally brittle.

Standard homopolymers of bisbenzocyclobutene resins (as described in the examples of U.S. Pat. No. 4,540,763) are brittle unless very high molecular weight resins are used. If very high molecular weight bisbenzocyclobutene resins are used, however, the materials are difficult to process into fiber-reinforced composites because of their high viscosity. Bismaleimide resins have this same disadvantage of brittleness and further tend to have high melting points and must be used with solvents in order to be readily processable. In addition, cured bismaleimide resins tend to have high (in the 5-7% range) water absorption. Copolymers of bisbenzocyclobutenes and bismaleimides as illustrated in the Example of U.S. Pat. No. 4,730,030 have improved properties including heat resistance but, like the cured homopolymers, lack the necessary toughness for high-performance applications. Bisbenzocyclobutene/bismaleimide uncured mixtures also have a tendency to exhibit viscosity instability in the molten state.

It is therefore an object of the invention to provide bisbenzocyclobutene/bismaleimide mixtures having improved viscosity stability. It is a further object of the invention to provide bisbenzocyclobutene/ bismaleimide copolymers having greater toughness.

BRIEF SUMMARY OF THE INVENTION

According to the invention, a composition is provided comprising a bisimide, a bisbenzocyclobutene and a free radical inhibitor for the bisimide. Such a composition exhibits good viscosity stability at high temperature and, when cured to co-crosslink the bisimide and the bisbenzocyclobutene, provides a thermoset material having enhanced toughness. In a preferred embodiment, a composition is provided comprising a bismaleimide, a bisbenzocyclobutene and from about 0.0002 to about 0.02 moles, per mole of the bismaleimide, of phenothiazine. The invention copolymers are tough, exhibit low water absorption and can be melt-processed for composites applications.

DETAILED DESCRIPTION OF THE INVENTION

The invention composition includes a bisimide of an unsaturated dicarboxylic acid. The preferred bisimides are N'N'-bisimides of unsaturated dicarboxylic acids which can be represented by the formula

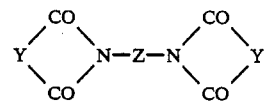

in which Y is a substituted or unsubstituted divalent radical containing at least 2 carbon atoms, preferably, 2 to 6 carbon atoms, and a carbon-carbon double bond, and Z is a divalent radical containing at least 1 and generally about 1 to 40, carbon atoms. Z can be aliphatic, cycloaliphatic, aromatic or heterocyclic. A preferred class of bisimides comprises bismaleimides derived from aromatic amines and can be represented by the formula

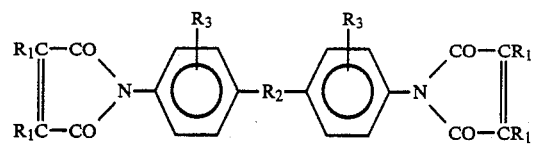

in which each $R_1$ is selected independently from H, $C_{1-2}$ alkyl or halide; $R_2$ is selected from divalent hydrocarbon radicals containing from about 1 to about 10 carbon atoms, —O—, —SO—, —COO—, —CONH—, —CO— and —S—; and each $R_3$ is selected independently from H, $C_{1-3}$ alkyl and halide.

Examples of such bisimides include
1,2-bismaleimidoethane
1,6-bismaleimidohexane
1,3-bismaleimidobenzene
1,4-bismaleimidobenzene
2,4-bismaleimidotoluene
4,4'-bismaleimidodiphenylmethane
4,4'-bismaleimidodiphenylether
3,3'-bismaleimidodiphenylsulfone
4,4'-bismaleimidodiphenylsulfone
4,4'-bismaleimidodicyclohexylmethane
3,5-bis(4-maleimidophenyl)pyridine
2,6-bismaleimidopyridine
1,3-bis(maleimidomethyl)cyclohexane
1,3-bis(maleimidomethyl)benzene
1,1-bis(4-maleimidophenyl)cyclohexane
1,3-bis(dichloromaleimido)benzene
4,4'-biscitraconimidodiphenylmethane
2,2-bis(4-maleimidophenyl)propane
1-phenyl-1,1-bis(4-maleimidophenyl)ethane
α,α-bis(4-maleimidophenyl)toluene
3,5-bismaleimide-1,2,4-triazole
and various N,N'-bismaleimides disclosed in U.S. Pat. No. 3,562,223, 4,211,860 and 4,211,861. Bismaleimides can be prepared by methods known in the art, as described in U.S. Pat. No. 3,018,290, for example.

The bismaleimide resin can also be an imide oligomer according to the formula

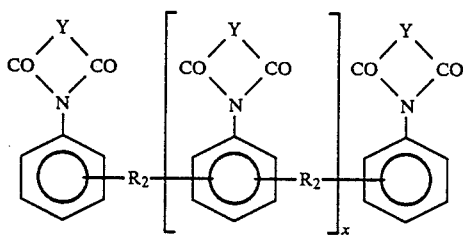

in which x is a number within the range of about 0.1 to about 2. Such oligomers can be prepared as described in U.S. Pat. No. 4,113,737, for example.

The preferred bisimide resin is N,N'-4,4'-diphenylmethane bismaleimide. The bisimide can contain various additives and modifiers as processing aids. The bisimide resin component can be a reaction product or prepolymer of a bisimide and an effective chain-extending agent such as an amine group-containing compound. Suitable amine group-containing compounds include diamines and polyamines represented by the general formula $(H_2N)_nQ$ and aminophenols represented by the general formula $(NH_2)_nQ(OH)_n$, in which Q is a divalent aromatic or alicyclic group and n is a number from 1 to about 4. Examples include bis(4-(N-methylamino)phenyl)methane, 1,3-diaminobenzene and the like. Such reaction products can be prepared by methods known in the art, such as contacting about 0.5 to about 1.2 mole of the chain extending agent per mole of the bisimide in an organic solvent at a temperature of about 40° to 250° for a time of about 5 minutes to 5 hours. The bisimide can be, for example, a hydrazide-modified bismaleimide as described in U.S. Pat. No. 4,211,860 and 4,211,861. Suitable N,N'-unsaturated bismaleimide resins commercially from Technochemie GmbH as Compimide® resins, for example.

The invention composition includes a bisbenzocyclobutene which can be described by the following formula

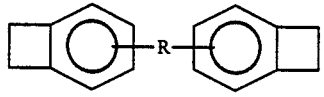 (I)

in which R can be selected from a wide range of organic and inorganic moieties including, for example, alkyl, cycloalkyl, aryl and heterocyclic. In a preferred embodiment, the bisbenzocyclobutene can be described according to one of formulas I, II or III

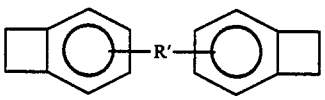 I

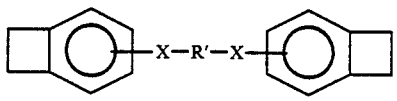 II

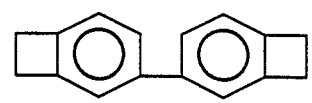 III in which R' is selected from unsubstituted or non-electrophilic substituted phenylene, naphthalenediyl, and

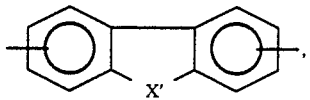

where X is selected from oxygen, sulfur, nitrogen, $-CH_2-$ and $-C(CH_3)_2-$, and X' is selected from O, S, N and $-CH_2-$. Examples of R' include o—, m— and p— phenylene, 2,7-naphthalenediyl and dibenzofurandiyl. The presently-preferred bisbenzocyclobutene, because of the superior properties of the copolymer, can be defined by formula I above when R is 1,3-phenylene.

PREPARATION OF BISBENZOCYCLOBUTENE MONOMERS

The preparation of bisbenzocyclobutene monomers is known generally in the art, for example, U.S. Pat. Nos. 4,540,763 and 4,711,964, the methods of which can be adapted for certain of the bisbenzocyclobutene monomers of the present invention compositions. Preparation of diaryl ethers of bisphenols is described in Williams, Kenney and Bridger, *J Org. Chem.*, 32, 2501–2502 (1967). Specifically, bis(benzocyclobutenyl)ethers of bisphenols can be synthesized by the Ullmann etherification of 4-bromobenzocyclobutene with a suspension of the disodium salt of a bisphenol such as resorcinol in refluxing pyridine (or an alkylpyridine) containing dissolved CuCl as a catalyst. The disodium salt of resorcinol is suitably prepared by the reaction of resorcinol with sodium methoxide in pyridine with the methanol removed as an azeotrope with pyridine. Similarly, arylene-bridged bisbenzocyclobutenes can be prepared by the reaction of benzocyclobutenyl Grignard reagent with dihaloarenes in the presence of various nickel or palladium compounds. This type of reaction is described in Kumada, *Pure Appl. Chem.* 52, 669–679 (1980). Benzocyclobutenyl Grignard reagent may in turn be prepared by the reaction of 4-bromobenzocyclobutene with magnesium in tetrahydrofuran. Preparation of 4,4'-(1,3-phenylenedioxy)bisbenzocyclobutene is illustrated in Example 1 herein.

Preparation of Bisbenzocyclobutene/Bisimide Copolymers

The bisimide and bisbenzocyclobutene monomers may be combined in any manner desired, such as melt, solution or powder blending. The preferred technique involves melting a mixture of the solid monomers containing the desired quantities of each monomer at a temperature above the respective melting points but below the polymerization temperature of either monomer, and stirring the melt until a homogeneous mixture is achieved. The melt may also be held at temperatures above about 200° C. for desired periods of time in a process of prepolymerization to increase the crystallization resistance of the melt and/or to increase its viscosity to desired levels. The mixture can then be poured directly into a mold for polymerization, or it can be cooled for later polymerization.

Polymerization is effected by heating the mixture to a temperature effective to initiate opening of the benzocyclobutene rings to form a transient diene which rapidly reacts with available maleimide groups. The temperature is generally at least about 180° C., preferably about 210° to about 350° C., held for a time of about 2 hours or more (with the required cure time dependent on the temperature-staging program used).

In order to achieve optimum properties in the copolymers, a mixture of the monomers and free radical inhibitor is heated at temperature near or above (at least about $Tg_u$-15° C.) the ultimate (fully cured) glass transition temperature of the copolymer composition ($Tg_u$) for a time sufficient to produce essentially complete reaction of the monomers. "Essentially complete" reaction of the monomers has been reached when no further reaction exotherm is observed by differential scanning calorimetry (DSC) upon heating the copolymer. The time of the heat treatment, or "post-cure," will vary depending upon the monomers, the degree of pressure applied and any pre-curing of the monomer mixture at temperatures lower than ($Tg_u$—15° C.). Preferably, this post-cure is at or above the $Tg_u$, most preferably at least 20° C. above $Tg_u$, but always lower than the temperature at which degradation of the copolymer will occur.

The relative amounts of the BCB and the BMI monomers affects the Properties of the cured copolymer. The molar ratio of BCB and BMI is generally within the range of about 0.6:1 to about 2.5:1, preferably about 0.7:1 to about 1 3:1, most preferably about 0.9:1 to about 1.1:1. The most pronounced effects of the radical inhibitor on copolymer toughness is in these near-stoichiometric ranges.

FREE RADICAL INHIBITOR

The invention composition includes a free radical inhibitor present in an amount effective to inhibit free radical polymerization of the bismaleimide monomer. Generally, the free radical inhibitor will be present in the composition in an amount within the range of about 0.0002 to about 0.02 moles per mole of the bismaleimide, preferably from about 0.001 to about 0.01 moles. The free radical inhibitor can be added to the monomers in any manner effective for intimate blending therewith, such as melt blending a mixture of the monomers and free radical inhibitor.

The preferred free radical inhibitor, because of the demonstrated toughness of the resulting copolymers, is phenothiazine.

THE COPOLYMERS

The preferred bisimide/bisbenzocyclobutene copolymers are characterized by glass transition temperatures (dynamic mechanical) generally above about 200° C., Mode I fracture toughness (ASTM E 399-83 using 1×1×1/8" samples) greater than about 2.0 MPa.m$^{\frac{1}{2}}$, most preferably greater than about 2.5 MPa.m$^{\frac{1}{2}}$, most preferably greater than about 3.0 MPa.m$^{\frac{1}{2}}$, and water absorption (93° C) less than about 3.0%, preferably less than about 2.0%. The copolymers are useful as resin matrices for composites in aerospace and electronics applications, including large structural parts and circuit boards. Based on their long shelf life and relatively low melting point, some of the uncured mixtures are useful for making tacky prepregs which can then be molded into composites. They are also suitable for liquid resin processing methods such as filament winding, resin transfer molding and pultrusion if the mixtures are heated to provide sufficiently low viscosity for fiber impregnation.

For preparation of reinforced laminate materials, a fibrous substrate of glass, carbon, quartz, poly(p-phenyleneterephthalamide), polyester, polytetrafluoroethylene, poly(p-phenylenebenzobisthiazole), boron, paper or like material, in chopped, mat or woven form, is impregnated with a bisimide/bisbenzocyclobutene composition in molten or solution form. A prepreg is formed by heating the impregnated substrate in an oven at a temperature sufficient to remove the solvent and to partially cure without gelation, or "B-stage," the resin system, generally about 180° C. to about 230° C., preferably about 200° to about 220° C., for a time of up to about 2 hours, preferably about 10 to about 40 minutes. A laminate is fabricated by subjecting a set of layered prepregs to conditions effective to cure the resins and to integrate the prepregs into a laminated structure. The laminate can optionally include one or more layers of a conductive material such as copper.

Laminating generally involves subjecting the prepregs to a temperature above about 200° C., preferably from about 210 to about 350° C, for a time of at least about 1 hour, at a pressure within the range of about 50 to about 500 psi.

For some laminating applications, it has been found advantageous to heat treat, or upstage, the BMI/BCB mixture prior to application to a laminating substrate, particularly if the mixture will be stored prior to use. Suitable heat treatment involves subjecting the BMI/BCB to an elevated temperature for a time sufficient to cause sufficient reaction and viscosity increase to inhibit crystallization of either or both monomers from the mixture upon storage, but not sufficient to gel the composition. Such heat treatment conditions generally include a temperature of at least about 200° C., preferably about 210 to about 230° C., for a time of at least about 10 minutes, preferably about 12 to about 90 minutes. The resulting mixture will be less tacky and less susceptible to crystallization of the components with storage.

EXAMPLE 1

Preparation of 4,4'-(1,3-phenylenedioxy)bisbenzocyclobutene

Into a 5-liter, 4-neck round bottom glass flask were weighed 205.2 grams (3.80 moles) of sodium methoxide, 220.2 grams (2.00 moles) of resorcinol, and 2500 grams of pyridine. The flask was then fitted with a paddle stirrer, stirrer rod and bearing, a thermometer, and a Vigreux column, distilling head and receiving flask for distillation. The apparatus was purged with nitrogen using a Firestone valve (U.S. Pat. No. 4,131,129) and distillation was started with stirring in order to remove methanol and form the disodium salt of resorcinol. Slow distillation was continued until the top of the column had come to constant temperature at the boiling point of pyridine. When methanol removal was complete, the Vigreux column was removed and replaced with a reflux condenser.

To the flask were then added 732.2 grams (4.00 moles) of dry 4-bromobenzocyclobutene. About 425 mL of a solution of CuCl in dry pyridine, containing about 3.6% CuCl, was placed in an addition funnel which was placed atop the flask. The system was purged again with nitrogen using the Firestone valve, 175 mL of the CuCl solution was allowed to flow into the flask, and reflux was started with gentle stirring. Reflux was continued for approximately 66 hours with periodic portionwise addition of the remaining CuCl solution. Approximately 75 mL of the remaining CuCl solution was added after 18 hours, 75 mL after 27 hours, 50 mL after 42 hours, and the remaining 50 mL after 51 hours.

The pyridine was then removed by vacuum distillation followed by removal of unreacted 4-bromobenzocyclobutene by steam distillation. The pot residue was then taken up in approximately 750 grams of cyclohexane and filtered. The cyclohexane solution was successively extracted with 300 grams each of 5%, 10%, 20%, and 40% aqueous NaOH solutions and then with 300 grams of 70% aqueous $H_2SO_4$ followed by 300 grams of water. The cyclohexane was then removed under reduced pressure on a rotary evaporator to yield 387.9 grams (1.234 moles, 64.9%) of crude 4,4'-(1,3-phenylenedioxy)bisbenzocyclobutene which crystallized on standing. Recrystallization from 550 grams of hexane yielded 272.8 grams of crystals melting at 60°-61.5° C. and with a purity of about 96% by liquid chromatography. Additional crops of crystals could be obtained by concentrating and cooling the mother liquor. Other crystallized batches of material had melting points as high as 65° C. and liquid chromatographic peak area percentages of over 98%.

Example 2 (Comparative)

Into a perfluoropolymer beaker were weighed 25.103 grams of 4,4'-bismaleimidodiphenylmethane, 4.227 grams of 2,4-bismaleimidotoluene, and 4.019 grams of 1,3-bismaleimidobenzene. The mixture was heated in an oven to 160-180° C, stirred until homogeneous, and allowed to cool to room temperature, solidifying to an amorphous mass. The mass was then broken up into small pieces for cocure with 4,4'-(1,3-phenylenedioxy)-bisbenzocyclobutene. (This mixture was used instead of a single bismaleimide resin for ease of processing, in order to prevent the bismaleimide from crystallizing from its molten mixture with the bisbenzocyclobutene resin.)

The bismaleimide mixture (14.4498 g) and 4,4'-(1,3-phenylenedioxy)bisbenzocyclobutene (13.5969 g) were weighed into a glass beaker. The beaker was then heated in an oil bath (and an oven) at 190-220° C. until the contents had melted. The contents were stirred until homogeneous and then degassed under vacuum at 190° C. The mixture was then poured into a mold formed from two sheets of glass separated by a ⅛" (3.18 mm) polytetrafluoroethylene spacer and held together by clamps. The mold was placed into an oven and cured for approximately 3 hours at 210° C., 15 minutes at 220° C., 15 minutes at 230° C., 15 minutes at 240° C., and 2 hours at 250° C. The mold was then allowed to cool to below 150° C. and the cured resin casting was removed from the mold. The casting had a dynamic mechanical glass transition temperature of 248° C., and a compact tension fracture toughness of 2.833 ±0.002 MPa.m^½.

EXAMPLE 3

A bismaleimide mixture was prepared as in Comparative Example 2, except that phenothiazine was added to the perfluoropolymer beaker. The bismaleimide mixture contained 50.20 grams of 4,4'-bismaleimidodiphenylmethane, 8.45 grams of 2,4-bismaleimidotoluene, 8.03 grams of 1,3-bismaleimidobenzene, and 0.2020 grams of phenothiazine. After melting, mixing and cooling as in Example 2, this phenothiazine-containing bismaleimide mixture (14.4485 g) was mixed with the same lot of 4,4'-(1,3-phenylenedioxy)bisbenzocyclobutene used in Example 2 (13.5978 g). The materials were mixed at 190° C. until homogeneous. The mixture was degassed under vacuum, poured into a mold, and cured as in Example 2. The cured resin casting had a dynamic mechanical glass transition temperature of 240° C. and a compact tension fracture toughness of 4.74 ±0.04 MPa.m^½. The latter toughness value is significantly higher than that for the casting in Example 2.

EXAMPLE 4 (COMPARATIVE)

The bismaleimide mixture containing no phenothiazine from Example 2 (1.0611 g) was mixed in a small glass beaker with 1.0043 g of the same lot of 4,4'-(1,3-phenylenedioxy)bisbenzocyclobutene used in Example 2. The beaker was partially immersed in an oil bath held at 220° C. and the resins were mixed until homogeneous. The mixture was upstaged for 20 minutes at 220° C. in the oil bath (the upstaging was performed in order to prevent the bismaleimides from crystallizing out on cooling). The upstaged mixture was then heated from room temperature to 260° C. at a rate of 2° C./min. in a Rheometrics viscometer. Viscosity of the mixture was 4.2 Pa.s at 90° C. and 0.1 Pa.s at 135° C. Viscosity rose to 0.1 Pa.s again at 227° C. and to 2000 Pa.s at 245° C.

EXAMPLE 5

The bismaleimide mixture containing phenothiazine from Example 3 (10.8085 g) was mixed in a small glass beaker with 10.1835 g of the same lot of 4,4'-(1,3-phenylenedioxy)bisbenzocyclobutene used in Examples 2 and 3. The components were mixed until homogeneous and the mixture was upstaged for 20 minutes at 220° C. as in Example 4. The upstaged mixture was then heated from room temperature to 260° C. at a rate of 2° C./min. in a Rheometrics viscometer. Viscosity of the mixture was 0.36 Pa.s at 90° C. and less than 0.1 Pa.s at 135° C. Viscosity rose to 0.1 Pa.s again at 235° C. and to 2000 Pa.s at 250° C. At each temperature, the viscosity was lower than for the mixture in Example 4.

I claim:

1. A composition comprising
   (a) a difunctional bisimide of an unsaturated dicarboxylic acid;
   (b) from about 0.6 to about 2.5 moles, per mole of the difunctional bisimide, of a bisbenzocyclobutene; and
   (c) a free radical polymerization inhibitor for the bisimide.

2. The composition of claim 1 in which the free radical inhibitor is present in an amount within the range of about 0.0002 to about 0.02 moles per mole of the bisimide.

3. The composition of claim 1 in which the bisimide is a bismaleimide.

4. The composition of claim 1 in which the free radical inhibitor is phenothiazine.

5. The composition of claim 1 in which the bisbenzocyclobutene can be represented by one of formulas I, II and III

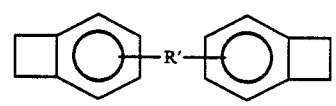

I

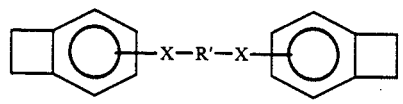

II

-continued

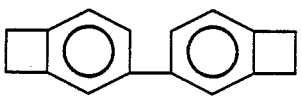
III in which R' is selected from phenylene, naphthylenediyl and

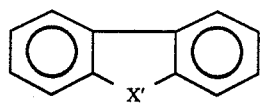

X is selected from oxygen, sulfur, nitrogen, —CH₂— and —C(CH₃)₂—, and X' is selected from oxygen, sulfer, nitrogen and —CH₂—.

6. The composition of claim 5 in which R is phenyl.
7. The composition of claim 6 in which X is oxygen.
8. The composition of claim 5 in which the free radical inhibitor is phenothiazine.
9. The composition of claim 6 in which the bisbenzocyclobutene is represented by formula III.
10. The composition of claim 8 in which the bisbenzocyclobutene is present in an amount within the range of about 0.7 to about 1.3 moles per mole of the bisimide.
11. A composition comprising the polymeric product of contacting, at a temperature of at least about 180° C.,
(a) a bisbenzocyclobutene;
(b) a bisimide; and
(c) a free radical polymerization inhibitor for the bisimide.
12. The polymeric composition of claim 11 in which the bisimide is a bismaleimide.
13. The polymeric composition of claim 11 in which the free radical inhibitor is present in an amount within the range of about 0.0002 to about 0.02 moles per mole of the bisimide.
14. The polymeric composition of claim 11 in which the bisbenzocyclobutene can be represented by one of formulas I, II and III

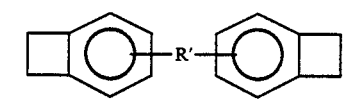
I

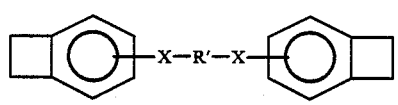
II

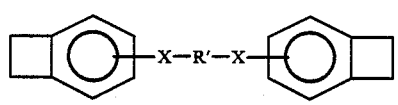
III in which R' is selected from phenylene, naphthalenediyl and

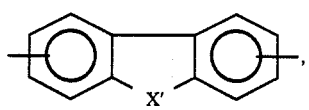

is selected from oxygen, sulfur, nitrogen, —CH— and —C(CH₃)₂—, and X' is selected from oxygen, sulfur, nitrogen and —CH₂—.

15. The polymeric composition of claim 14 in which R is phenylene.
16. The polymeric composition of claim 15 in which X is oxygen.
17. The polymeric composition of claim 14 in which the free radical initiator is phenothiazine.
18. The polymeric composition of claim 17 in which the bisbenzocyclobutene is present in an amount within the range of about 0.7 to about 1.3 moles per mole of bisimide.
19. The composition of claim 13 in which the bisimide comprises bis(4-maleimidophenyl)methane.
20. The composition of claim 13 which has a glass transition temperature greater than 200° C. and a Mode I fracture toughness greater than about 2.0 MPa.m^½.
21. The composition of claim 13 which has a glass transition temperature greater than 200° C. and a Mode I fracture toughness greater than about 2.5 MPa.m^½.
22. A prepreg comprising the composition of claim 1 and a fibrous substrate.
23. An article of manufacture comprising the composition of claim 11 and a fibrous substrate.
24. An article of manufacture comprising the composition of claim 13 and a fibrous substrate.
25. An article of manufacture comprising the composition of claim 20 and a fibrous substrate.
26. An article of manufacture comprising the composition of claim 21 and a fibrous substrate.
27. A method for making a bisbenzocyclobutene/bismaleimide copolymer having a glass transition temperature greater than 200° C. and a Mode I fracture toughness greater than about 2.5 MPa.m^½, the method comprising:
(a) blending (i) a bismaleimide monomer; (ii) from about 0.6 to about 2.5 moles, per mole of the bismaleimide, of a bisbenzocyclobutene which can be represented by one of formulas I, II and III

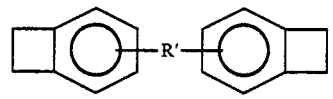
I

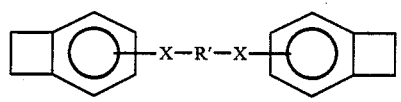
II

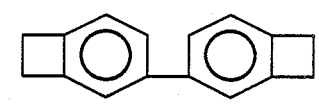
III in which R' is selected from phenylene, naphthalenediyl and

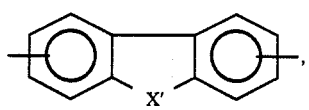

X is selected from O, S, N, —CH₂— and —C(CH₃)₂—, and X' is selected from O, S, N and —CH₂—; and a free radical polymerization inhibitor for the bismaleimide monomer;
(b) heating said blend to a temperature of at least (Tg_u-15° C.), where Tg_u is the fully-cured glass transition temperature of the bisbenzocyclobutene/bismaleimide copolymer, for a time sufficient for essentially complete reaction of bismaleimide and bisbenzocyclobutene monomers.

28. The method of claim 27 in which R is phenylene.

29. The method of claim 27 in which the molar ratio of the bisbenzocyclobutene monomer to the bismaleimide monomer is within the range of about 0.7:1 to about 1.3:1.

30. The method of claim 27 in which the bismaleimide comprises bis(4-maleimidophenyl)methane.

31. The method of claim 27 in which the bisbenzocyclobutene can be represented by formula III.

32. The method of claim 27 in which the copolymer has a Mode I fracture toughness greater than about 2.5 MPa.m$^{\frac{1}{2}}$.

33. The method of claim 27 in which the free radical polymerization inhibitor is phenothiazine.

34. The method of claim 27 in which the free radical polymerization inhibitor is present in an amount within the range of about 0.002 to about 0.02 moles per mole of the bismaleimide.

35. The method of claim 27 in which the blend is heated to a temperature of at least about ($Tg_u + 20°$ C.).

36. The method of claim 35 in which the free radical polymerization inhibitor is phenothiazine.

37. The method of claim 36 in which the molar ratio of the bisbenzocyclobutene monomer to the bismaleimide monomer is within the range of about 0.9:1 to about 1.1:1.

38. The method of claim 27 in which the bisbenzocyclobutene/bismaleimide copolymer has a Mode I fracture toughness greater than 3.0 MPa.m$^{\frac{1}{2}}$.

* * * * *